United States Patent [19]
Curtis

[11] Patent Number: 5,302,944
[45] Date of Patent: Apr. 12, 1994

[54] METHOD AND APPARATUS FOR THE MONITORING OF THE OPERATION OF LINEAR AND ROTARY ENCODERS

[76] Inventor: Stephen J. Curtis, 213 Harris Rd., Nashua, N.H. 03062

[21] Appl. No.: 734,244

[22] Filed: Jul. 22, 1991

[51] Int. Cl.$^5$ .......................................... G08B 21/00
[52] U.S. Cl. .................... 340/653; 340/657; 340/661; 250/205; 250/231.16; 346/108
[58] Field of Search ........ 340/653, 657, 630, 660–663; 250/205 X, 231.16 X, 231.14, 237 G; 346/108

[56] References Cited

U.S. PATENT DOCUMENTS

| | | | |
|---|---|---|---|
| 4,097,732 | 6/1978 | Krause et al. | 250/205 |
| 4,206,456 | 6/1980 | Malinowski et al. | 340/630 |
| 4,581,617 | 5/1986 | Yoshimoto et al. | 346/108 |
| 4,620,094 | 10/1986 | Tani et al. | 250/205 X |
| 5,051,579 | 9/1991 | Tsukiji et al. | 250/231.16 |

*Primary Examiner*—Jeff Hofsass
*Attorney, Agent, or Firm*—Robert K. Tendler

[57] ABSTRACT

A system is provided for monitoring signals from a linear or rotary encoder or scale to provide a warning of a malfunction of the encoder or to be able to predict a future malfunction. The system includes a feedback circuit for comparing the output of the detector in the encoder with a voltage reference and for either raising or lowering the voltage to the light source for maintaining constant maximum detected light amplitude regardless of dirt build-up on the scale with the amount of voltage correction to the light source being an indicator of the level of functioning of the encoder. The system also assures constant amplitude output signals from reflectance-type encoders in which the light source and detector are on the same side of the scale and in which the subject servo system maintains a constant amplitude reflected beam. In one embodiment, an absolute voltage reference check is provided such that when the error signal used to control the light source voltage exceeds a predetermined threshold, an outright failure alarm indicator is actuated. The system, as a by-product, also provides a constant amplitude output signal for the encoder to simplify downstream processing, a feature uniquely applicable to reflecting scales such as ruled steel, which suffer not only from contamination, but also due to the variation in distance between the surface of the scale and both the light source and detector.

9 Claims, 4 Drawing Sheets

METHOD AND APPARATUS FOR THE MONITORING OF THE OPERATION OF LINEAR AND ROTARY ENCODERS

FIELD OF THE INVENTION

This invention relates to rotary or linear encoders and more particularly to a scale guarding system in which the efficiency of the encoder is monitored, with suitable alarms being initiated for a malfunctioning encoder, or one whose time history of operation indicates imminent failure.

BACKGROUND OF THE INVENTION

As is common, rotary and linear encoders have been utilized to measure shaft rotation or linear movement through the interposition of a scale provided with opaque and transparent regions lying next to each other in a regular pattern. When the scale is passed between a light source and a detector, the output of the detector is a series of pulses or sine waves which are detected to derive either the position of the scale or angular position of a rotary shaft.

One of the major causes of failure for such encoders is the problem of dirt or other contaminants in the light path between the light source and the detector. Typically, encoder scales become so dirty in the environment in which they are employed, that the intensity of the beam from light source to detector is so reduced by a dirty scale that spurious readings result.

This dirty-scale condition is not readily apparent until the operation of the encoder has so deteriorated that erroneous readings cause equipment malfunction. When encoders are utilized in a servo loop for instance for positioning a valve, the erratic reading may go undetected until such time as valve operation is so impaired that catastrophic results occur. It will be apparent that such a failure could be catastrophic when such a servo system is used to control fuel to a rocket engine, or when such a valve is utilized to control a chemical process. In fact, weak signals from encoders are responsible for unexplained erratic behavior sometimes attributed to other causes within the servo system.

It is therefore necessary to provide an early warning system for the malfunctioning of rotary or linear encoders in which not only is catastrophic failure of the encoder indicated as an alarm condition, but also the deterioration of the encoder output over time is detected to indicate either a predictable mean time to failure for the encoder, or to permit encoder replacement or repair prior to outright failure.

As an additional problem, for reflectance type encoders in which the light source and the detector are on the same side of the scale and light is reflected from the source to the detector, movement of the scale away from the source/detector pair results in a decreased detector output due to a portion of the light being reflected away from the detector's position. As a result, these encoders have a varying amplitude output which is difficult to process by downstream equipment.

Moreover, unstable voltages applied to the light source can in fact simulate a dirty scale, such that the erratic readings from the encoder may be attributed to the wrong source, usually contamination.

It is therefore necessary to provide a system which if it cannot distinguish between the variable voltage condition or the dirty encoder scale condition, at least provides a warning and a histogram from which the cause of the encoder output degradation can be ascertained.

SUMMARY OF THE INVENTION

In order to provide a scale guarding technique and system, a method and apparatus is provided for sensing the maximum amplitude of the light coming from the scale and for ascertaining malfunction or potential malfunction through the error voltage utilized to maintain a constant maximum detector output. This is accomplished by varying the voltage to the light source. It will be appreciated that the error signal utilized is an excellent indicator of the status of the encoder output signal since, in one embodiment, the output voltage from the detector is compared to a reference standard and the voltage to the light source raised upwardly for the detector voltage going below a preset reference voltage, whereas the light source voltage is decreased for detector outputs which exceed this reference voltage. The error signal, e, can be utilized in and of itself to indicate a malfunction of the encoder since if this error signal rises above a predetermined threshold it signifies that the amplitude of the detected light is degraded below some predetermined design specification level. Should the error signal increase drastically over a short time, this is an indication of potentially complete occlusion of the light path between the light source and the detector, either indicating complete scale degradation due to dirt and other contaminants, or a faulty light source. In either event, this is sensed as alarm condition to indicate outright failure.

Future failure is indicated, in one embodiment, by generating a histogram of the error signal over time so as to be able to track or predict mean time to failure of the encoder, absent a catastrophic failure such as light source burnout, or complete occlusion of the scale by some catastrophic event. In order to measure this, $\Delta e/\Delta T$ may be utilized as a quantity for measuring the time varying rate of deterioration such that when this rate exceeds a predetermined threshold, a second alarm indication may be actuated.

In one embodiment, the control loop includes an up/down counter coupled to the output of a comparator, with a count up resulting in increased light source voltage; and with a count down reducing the voltage. The number associated with the increment or decrement during a given period of time is defined as the error signal, e, with standard digital processing being able to provide alarm condition calculations based on the increment or decrement of the number in the counter.

In summary, a system is provided for monitoring signals from a linear or rotary encoder or scale to provide a warning of a malfunction of the encoder or to be able to predict a future malfunction. The system includes a feedback circuit for comparing the output of the detector in the encoder with a voltage reference and for either raising or lowering the voltage to the light source for maintaining constant maximum light transmission or reflectance respectively through the transparent portions of the scale or from reflective surfaces of the scale; thus regardless of dirt build-up on the scale. Here the amount of voltage correction to the light source is an indicator of the level of functioning of the encoder.

In one embodiment, an absolute voltage reference check is provided such that when the error signal used to control the light source voltage exceeds a predetermined threshold, a failure alarm indicator is actuated.

Additionally, in one embodiment, a histogram is provided in which the error signal is graphed over time, with the histogram indicating the condition of the encoder by documenting any decline in operation. In this latter case, a warning as to future malfunction is determined by the rate of change of the error signal, $\Delta e/\Delta T$, increasing above a predetermined threshold. The system, as a by-product, additionally provides a constant maximum amplitude output signal for the encoder to simplify downstream processing, a feature uniquely applicable to reflecting scales such as ruled steel, which suffer not only from contamination, but also due to variation in the distance between the surface of the scale and both the light source and detector which are on the same side as the scale.

In a preferred embodiment, the output from the encoder's detector is coupled to a comparator, the output of which is utilized to drive an up/down counter which is incremented for signals below a reference threshold and which is decremented for signals above this reference threshold. Since rotary encoders or linear encoders usually provide quadrature output signals which are 90 degrees out of phase, positive going zero crossovers are utilized to provide clock pulses for the sampling of the other of the quadrature signals, with the sampling to occur at or about top dead center of the sampled waveform. This provides for a sampled voltage corresponding to the maximum voltage obtainable from the output of the detector.

Additionally, this system provides for measurement only when the encoder scale is moving, with the direction of movement being ascertainable from the system. In order to accomplish this, system clock pulses used for sampling are only generated when the scale is moving. Thus measurements are only taken on a moving scale to provide system stability.

BRIEF DESCRIPTION OF THE DRAWINGS

These and other features of the subject invention will be better understood in conjunction with the Detailed Description taken in conjunction with the Drawings of which.

DETAILED DESCRIPTION

Figure 1A:
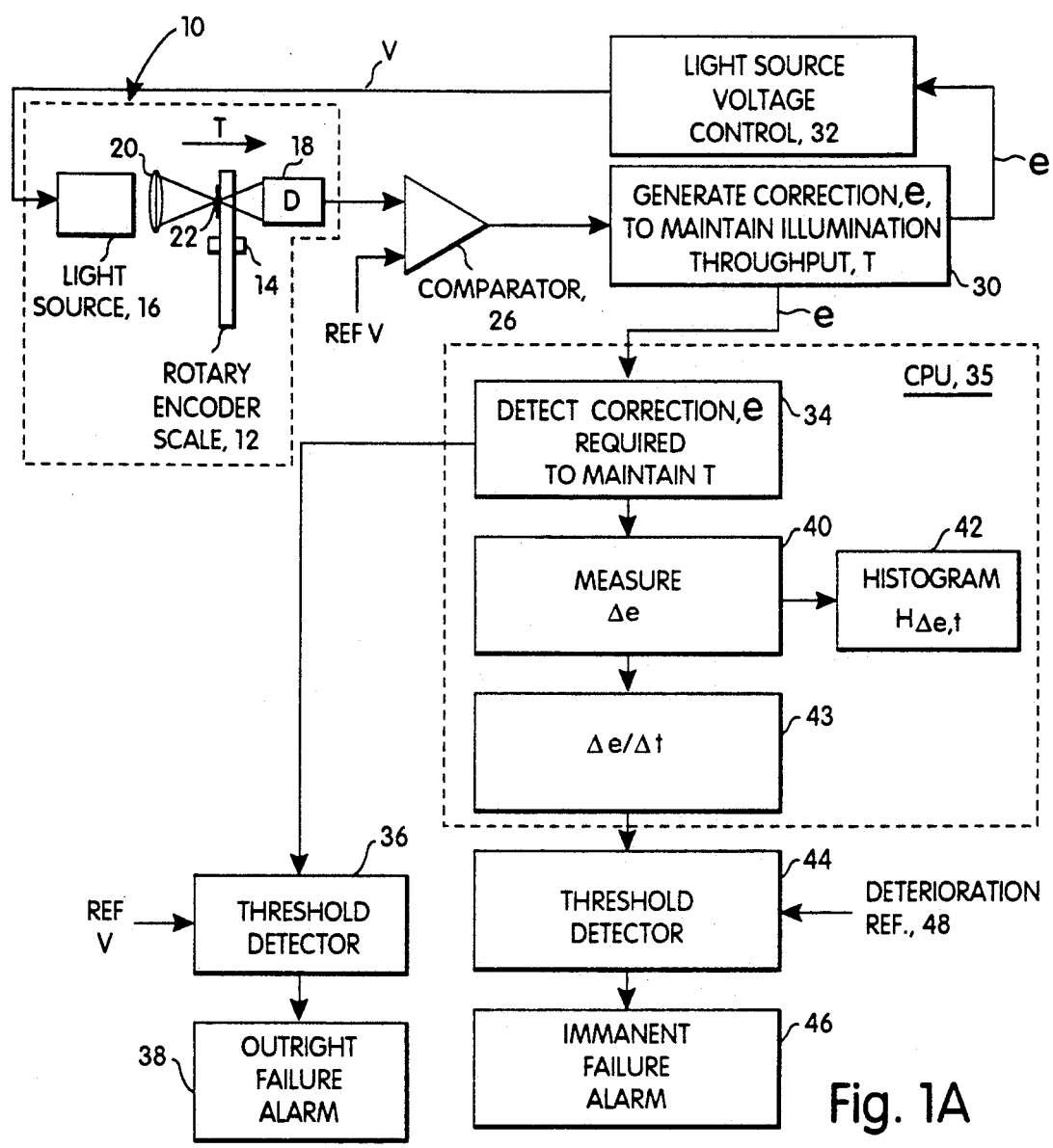
FIG. 1A is a block diagram illustrating the subject system for light source voltage control and the generation of an error signal which is utilized to detect both imminent scale failure and outright failure.

Referring now to FIG. 1A, encoder 10, here a rotary encoder, is provided with a rotary encoder scale 12 which rotates about a shaft 14 and is positioned between a light source 16 and a detector 18, with the light from light source being focused by a lens 20 onto a marking 22 on the scale. The output of detector 18 is coupled to a comparator 26 to which is applied a reference voltage, in one embodiment 5 volts. The output of comparator 26 is coupled to a unit 30, the function of which is to generate a correction signal, e, which is utilized to maintain the illumination throughput, T, such that the maximum illumination throughput is constant. In order to do this, the signal generated by unit 30 is applied to a voltage control unit 32 which supplies a voltage, V, to light source 16 in a closed loop arrangement.

The error signal, e, is applied from unit 30 to a unit 34, optionally in a CPU 35, which detects the correction signal, e. This signal is converted to a signal having a magnitude corresponding to the absolute value of the error signal; and is applied to a threshold detector 36, with its other input being a reference voltage, REF V. The output of threshold detector 36 is a signal which is coupled to Outright Failure Indicator 38 upon detection of an error signal increasing beyond the threshold limit. This indicates outright failure of the encoder, presumably due to either a completely occluded encoder scale or failure of a light source.

Before outright failure, imminent (e.g. future) failure is detected by measuring $\Delta e/\Delta T$ by a measuring unit 40 within CPU 35 which supplies the result to a histogram generating system generally indicated by reference character 42. The histogram is a graph of the change in the error signal over time. It will be appreciated that upon viewing the histogram produced by this system, one can ascertain whether or not the output of the encoder is deteriorating or not to permit appropriate action to be taken.

Alternatively, $\Delta e/\Delta T$, can be calculated as illustrated at 43 within CPU 35, with a signal representing the magnitude of this ratio being supplied to a threshold detector 44, the output of which is applied to an Imminent Failure Alarm unit or indicator unit 46, with threshold detector having been supplied with a deterioration reference level as indicated at 48.

In this manner an encoder's operation can be monitored both for outright failure and imminent future failure.

Figure 1B:
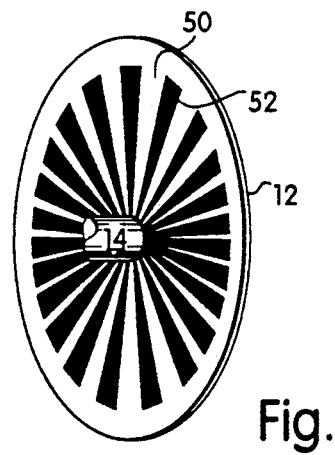
FIG. 1B is a diagrammatic illustration of a rotary encoder scale for use in the system of FIG. 1A.

Referring to FIG. 1B, a rotary encoder scale 12 is illustrated as having alternating light and dark areas respectively illustrated by reference characters 50 and 52 which determine the angular position of shaft 14 and are therefore useful in measuring its motion.

Figure 2A:
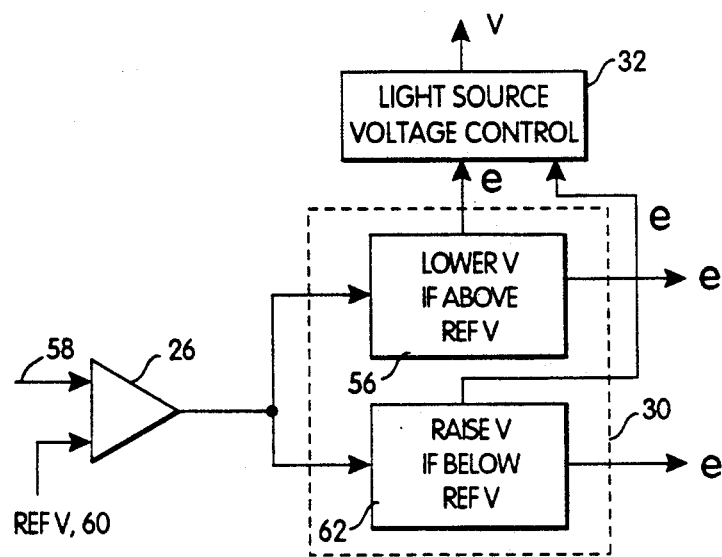
FIG. 2A is a block diagram illustrating the unit utilized to generate a correction voltage to maintain illumination throughput by the raising and lowering of the voltage to the light source.

Referring now to FIG. 2A, unit 30 which generates the correction signal is illustrated as including a unit 56 which produces a signal, e, having a magnitude which increases if the signal on input 58 of comparator 26 exceeds the reference voltage illustrated at 60. This signal then causes the light source voltage control unit 32 to decrease its voltage.

Likewise, if input signal 58 is below the reference voltage shown inputted at 60, then a unit 62 provides an error signal, e, which is applied to light source 32 to increase the voltage to the light source.

Figure 2B:
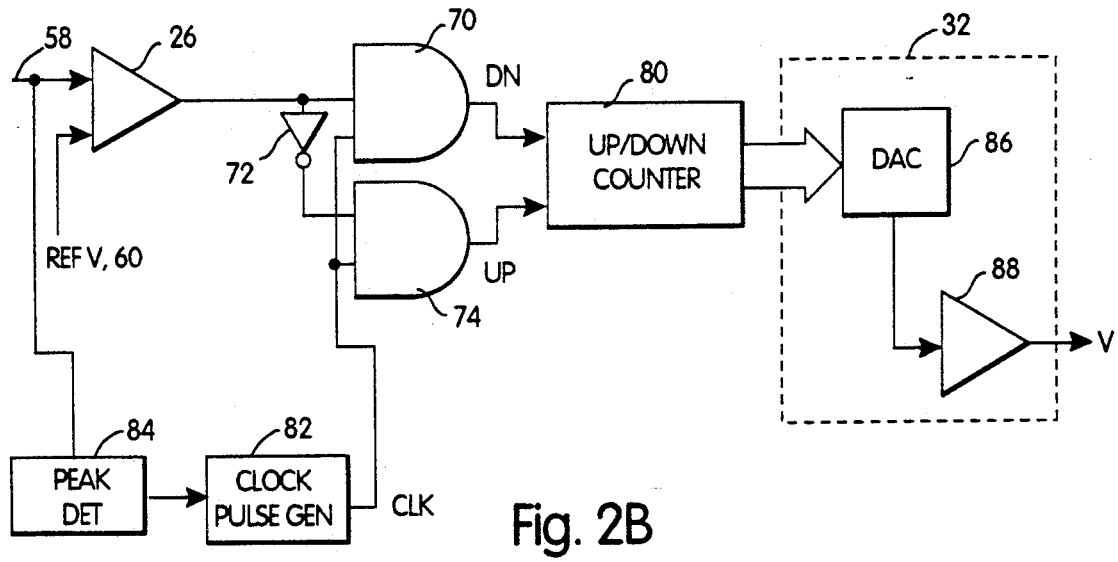
FIG. 2B is a block diagram illustrating one embodiment of the unit for generating the correction voltage through the utilization of zero cross over detection and the utilization of an up/down counter, the output of which is converted to an analog signal through a digital to analog converter and an amplifier within the light source voltage control unit of FIG. 1A.

How this is accomplished is illustrated in FIG. 2B. The output of comparator 26 is applied to one input to an AND gate 70 and through an inverting diode 72 to an input of AND gate 74 as illustrated. Clock pulses are provided to the other inputs of AND gates 70 and 74. AND gate 70 provides a pulse to up/down counter 80 to decrement this counter, whereas the output of AND gate 74 provides a pulse to counter 80 to increment this counter.

The clock pulses are provided via a clock pulse generator 82 which generates a clock pulse at each time there is an output of a peak detector 84 which is coupled thereto, and which samples the signal at input 58 to ascertain its peak. Therefore, the sampling and clocking is accomplished at the peak of the pulses from the encoder. This means that it is maximum illumination which is sensed in order to provide control for the light source and thus the generation of the aforementioned error signal.

As illustrated in FIG. 2B, the output of up/down counter 80 is provided to a digital to analog converter 86, the output of which is applied to a voltage amplifier 88. The output of amplifier 88 is utilized to provide power to the illuminating source for the encoder.

Figure 3:
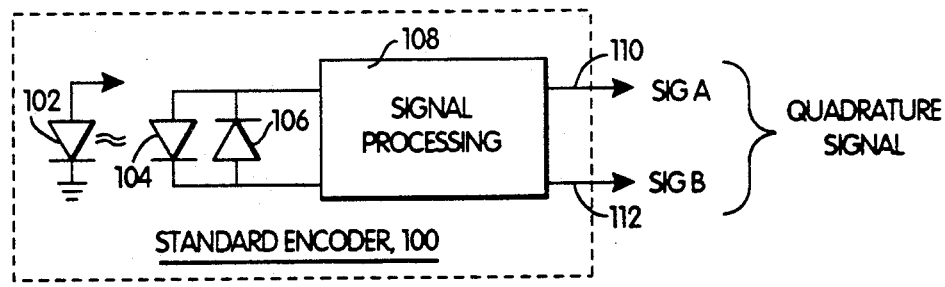
FIG. 3 is a block diagram illustrating a standard comparator and quadrature signals therefrom.

Referring now to FIG. 3, in order to be able to provide clock pulses which result in sampling of peak signals, it is important to understand that a standard decoder, here shown at 100, includes a light source in the form of an LED 102 and back-to-back diode detectors 104 and 106 coupled to a signal processing unit 108. The output of this unit is in the form of quadrature signals A and B, as illustrated at outputs 110 and 112 respectively.

Figure 4:
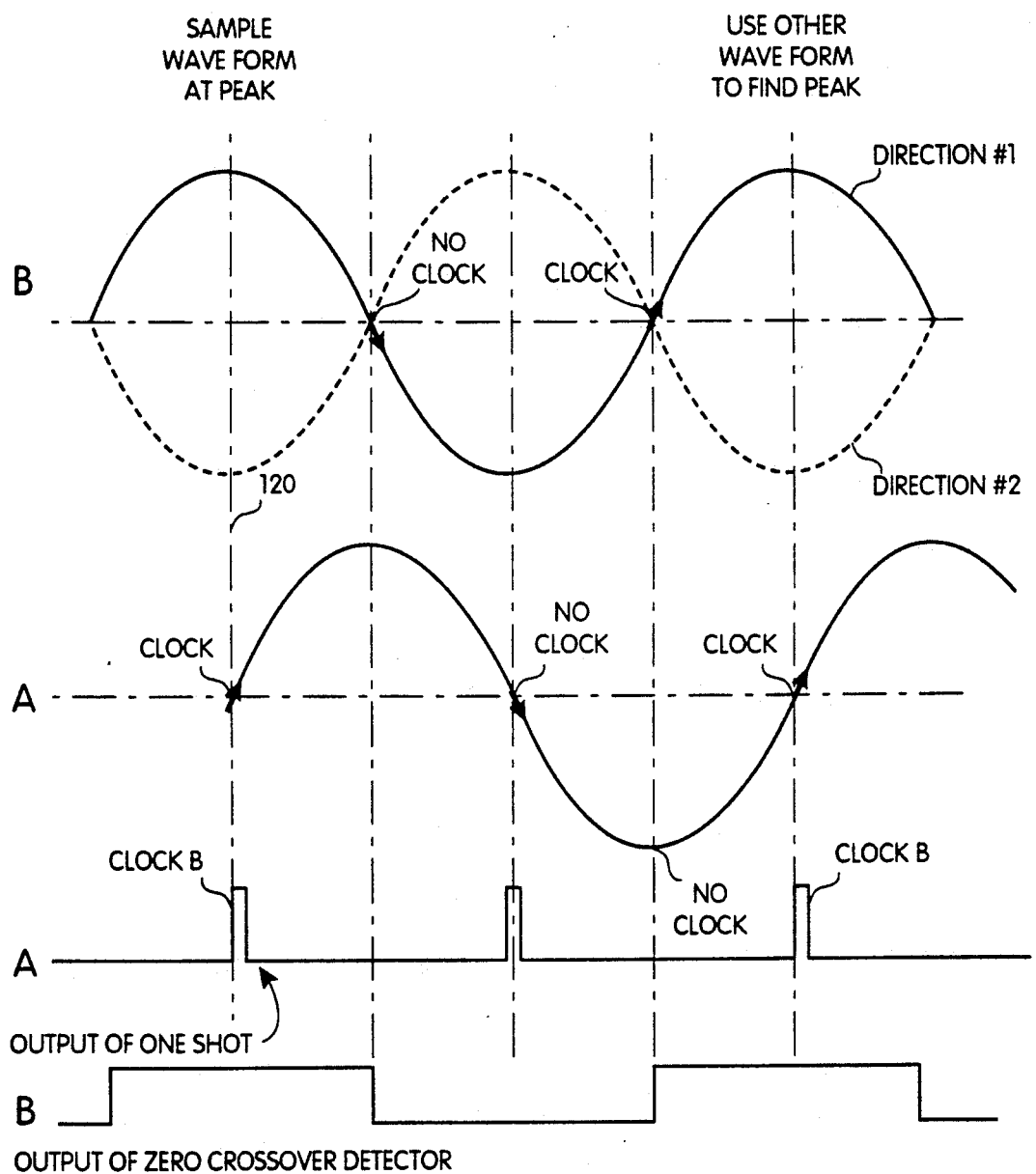
FIG. 4 is a waveform diagram illustrating the output signals from a standard encoder of FIG. 3, also illustrating the generation of clock pulses from one of the two quadrature signals so as to be able to sample the other of the two quadrature signals; and, FIG. 5 is a detailed block diagram of one embodiment of the subject invention illustrating the utilization of quadrature signals in the control of scale illumination.

Referring now to FIG. 4, for a scale moving in a first direction, DIRECTION #1, it can be seen that it is possible to utilize one of the two quadrature signals to provide the clock pulses for sampling the other of the two quadrature signals at the peak thereof.

As can be seen from waveform A in this diagram, circuits can be arranged such that clock pulses are generated only on positive going excursions across a zero level as sensed by a zero crossover detector which will be described. The output of the zero crossover detector can be sharpened and applied as a clock pulse to measure or sample the other quadrature waveform at its peak as illustrated by a dotted line 120. Assuming that Signal A is applied to a zero crossover detector/one shot multi-vibrator combination to provide sampling pulses for Signal B; and assuming the duration of the output of another crossover detector coupled to Signal B is high indicating a positive Signal B peak, it can be seen that the output of an AND gate can be activated only at positive Signal B peaks. Thus, the B waveform is sampled only at its positive peak due to the 90 degree phase shift between the Signal A and B waveforms.

It will also be appreciated that in the scenario shown in FIG. 4, it is only Signal B which can be sampled. This is because the encoder scale is going in DIRECTION #1. For movement in an opposite direction, DIRECTION #2, Signal A can be sampled by providing a duplicate set of electronics such that it is the A waveform which is sampled, with the B waveform providing the clocking pulses. For DIRECTION #2 movement, waveform B is inverted 180 degree and is 270 degrees out of phase with waveform A. This is shown by the dotted B waveform. The direction of the encoder scale can be sensed by providing In this manner either direction of the encoder scale can be accommodated.

Figure 5:
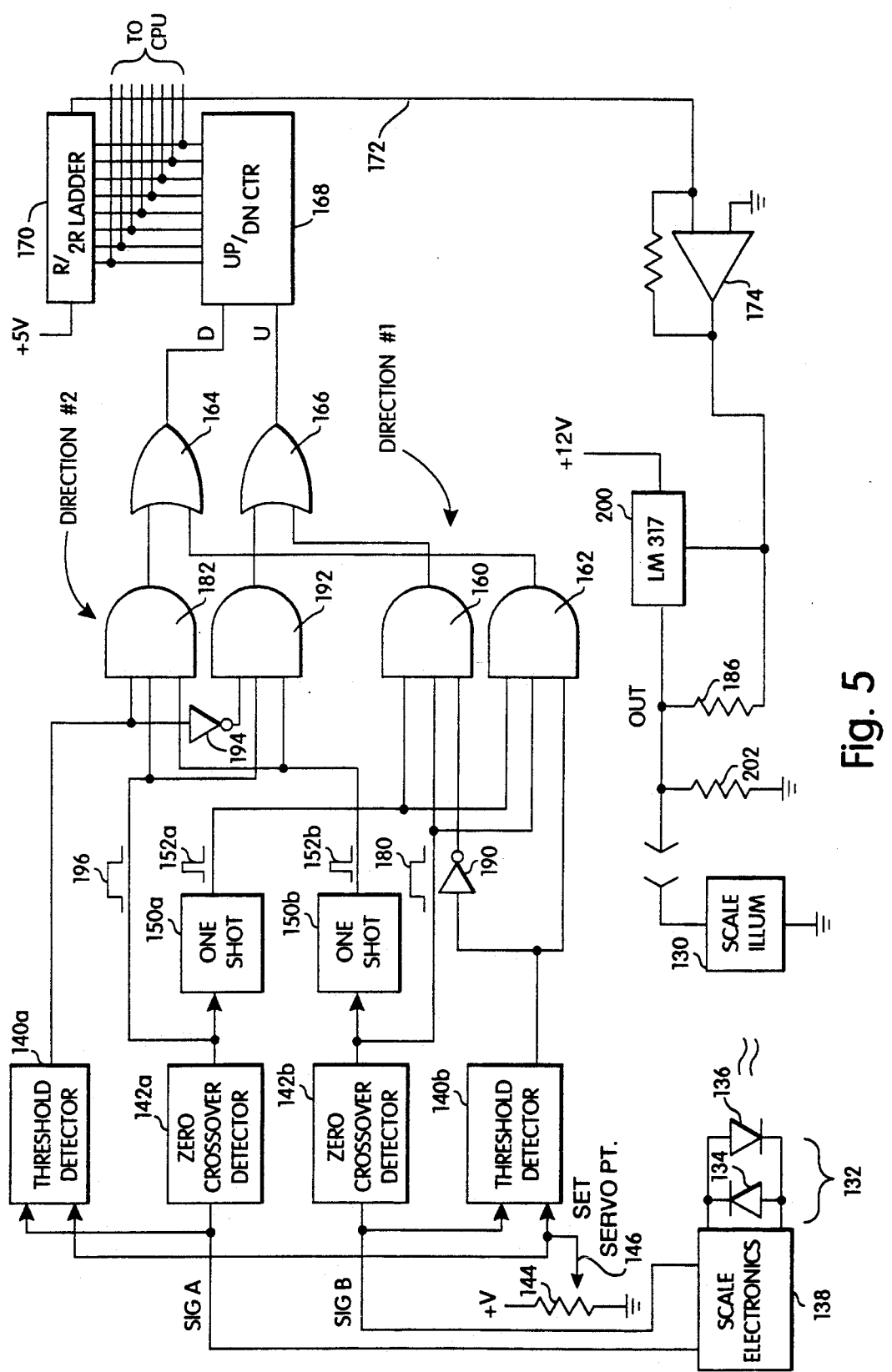

Referring now to FIG. 5, in one embodiment the system of FIG. 1A can be implemented through the utilization of pairs of threshold detectors, zero crossover detectors, and one shot multi-vibrators. In this figure, the encoder includes a scale illumination 130 and a detector here illustrated at 132 to include back-to-back diodes 134 and 136 which are coupled to scale electronics 138 adapted to provide the aforementioned quadrature signals, Signal A and Signal B.

Each of these quadrature signals is supplied to its respective threshold detector 140a and 140b and also simultaneously to zero crossover detectors, respectively 142a and 142b. It will also be appreciated that threshold detectors 140a and 140b are provided with a variable reference voltage supply by a resistor 144 between V+ and ground, in which the voltage reference can be varied via tap 146.

The outputs of respective zero crossover detectors 142a and 142b are provided to corresponding one shot multi-vibrators 150a and 150b that provide short squared up clocking pulses 152a and 152b for each positive going zero crossing of the input signal.

The output of one shot multi-vibrator 150a is applied to the input terminals to AND gates 160 and 162, the outputs of which are applied respectively to OR gates 164 and 166. The outputs of these OR gates drive an up/down counter 168, with each output line representing a digit driving an R2R ladder network 170 for the generation of a corresponding analog error voltage applied by line 172 to an amplifier 174 which is utilized to drive scale illuminator 130 with the appropriate voltage, through the use of current amplifier 200.

In operation, for scale movement in DIRECTION #1, a positive going Signal B produces an elongated positive pulse 180 to establish when Signal B is positive. This elongated positive pulse is applied to one of the inputs to AND gate 162. The other input to AND gate 162 is provided with the short clock pulse 152a from one shot multi-vibrator 150a such that the output of threshold detector 140b is sampled upon a crossover of Signal A during which time Signal B has been verified as being positive via the output of zero crossover detector 140b. The B signal, should it be above the threshold detector level set by threshold detector 140b, causes an output from AND gate 162 to be applied to one input of OR gate 164, which decrements up/down counter 168. This is appropriate since the Signal B level is above the chosen threshold. Upon decrementing up/down counter 168, the resulting decreased number is sensed by R2R ladder 170, with a signal resulting from the combined count of counter 168 being utilized to drive down the output from amplifier 174 such that its output reduces the illumination available from scale illuminator 130.

It will be appreciated that threshold detector 140b has an output applied to inverter 190, the output which is applied to one of the inputs to AND gate 160, which also has applied to it a Signal A sampling pulse and a Signal B positive going assurance pulse. If the Signal B amplitude is lower than the threshold that detector 140b is set at, the output of threshold detector 140b goes low. Because the output of threshold detector 140b is inverted, there will be an output from AND gate 160 to OR gate 166, which results in incrementing counter 168. Note, for DIRECTION #1, neither AND gate 182 or AND gate 192 has an output and so has no affect on the system as long as the scale moves in this direction.

In the case illustrated, it is the Signal A waveform which results in the sampling pulses to sample Signal B. For a reverse direction, it would be the Signal B signal which provides sampling pulses for sampling Signal A. This is accomplished through the action of zero crossover detector 142b and one shot multi-vibrator 150b to provide the clock pulse; through zero crossover detector 142a to assure a positive Signal A peak; and through threshold detector 140a to determine the Signal A level.

Thus, the FIG. 5 circuit will operate regardless of the direction of motion of the scale.

Note that the output of amplifier 174 is applied to current source 200 to increase the light source drive voltage current.

The following text is an algorithm for predicting failures of a scale using the scale guard system. The only undefined operations are get_limit(), and get_sample(). The results of the get_limit() operation is a voltage level corresponding to the point of scale failure. This algorithm predicts when the encoder will need that level of voltage. The result of the get sample() operation is the voltage signal currently being applied to the scale.

```
limit = get_limit( )
first_sample = get_sample( )
for every hour
   sample = get_sample( )
   current_slope = (sample - first sample) / hours
   if current_slope 0 then
      hours_until_failure = (limit - sample) / current_slope;
   endif
end for
```

Hours is the number of hours that have passed since the first sample was taken. The equations were generated from the standard line equations. The first sample is combined with the current sample and is used to generate a line, where the X axis is hours, and the Y axis is voltage. The slope of this line is found, and is used to determine where that line would cross the voltage limit. Hours is arbitrary, any unit of time could be used.

```
/ This software was written to test implementation of the
  scaleguard's ability to predict future failures based on the
  current rate of change in the error signal.
/
#include <stdlib.h>
#include <oath.h>
#include <stdio.h>
#define TRUE -1
#define FALSE 0
main ( )
{
   double yellow_limit,red_limit;
   double first_sample,sample;
   double current_slope, hours_until_failure;
   int hours;
   printf("Enter yellow limit of scale voltage >");
   scanf("%lf",&yellow_limit);
   printf("Enter red limit of scale voltage >");
   scanf("%lf",&red_limit);
   hours = 0;
   printf("Please enter the first sample >");
   scanf("%lf",&first_sample);
   while(TRUE) {
      hours = hours + 1;
      printf("Hour number %d  n",hours);
      printf("Enter new sample >");
      scanf("%lf",&sample);
      current_slope = (sample - first sample) / hours;
      if (current_slope <= 0.0) {
         printf("The scale will never fail!  n");
```

```
   } else {
      hours_until_failure = (yellow_limit - sample) /
   current_slope;
      if(hours_until_failure <= 0.0)
         printf("The yellow light is lit  n");
      else
         printf("The yellow light will light in %lf hours.  n",
         hours_until_failure);
      hours_until_failure = (red_limit - sample) /
   current_slope;
      if(hours_until_failure <= 0.0)
         printf("The red light is lit  n");
      else
         printf("The red light will light in %lf hours.  n",
         hours_until_failure);
```

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. Apparatus for monitoring the condition of an encoder having a scale which is illuminated from a light source and in which light from the scale is detected by a detector, so as to provide an indication of potential, imminent or actual encoder failure, comprising:
   a feedback circuit for varying the power to said light source, said feedback circuit providing constant maximum intensity light from the scale through the monitoring of light from the scale, said feedback circuit including means coupled to said detector for detecting a maximum output therefrom, and means including a feedback signal for adjusting the output of said light source so as to maintain said maximum detector output at a predetermined level;
   means for monitoring said feedback signal to provide an error signal representing the variation in said feedback signal and thus the amount of adjustment of the output of said light source; and,
   means for providing an alarm indication responsive to said error signal, whereby said alarm indication can indicate either potential or imminent encoder failure as well as actual encoder failure.

2. The apparatus of claim 1 wherein said alarm indication is provided when the amount of adjustment of said light source as indicated by said error signal exceeds a predetermined threshold.

3. The apparatus of claim 1 wherein said alarm indication is provided when the time varying rate of change of said error signal exceeds a predetermined threshold.

4. The apparatus of claim 1 wherein said encoder provides two quadrature output signals and wherein said maximum output detecting means includes means associated with one of said quadrature output signals for sampling the other of said quadrature output signals.

5. The apparatus of claim 4 wherein said sampling means includes means coupled to said one quadrature output signal for generating a sampling pulse upon a zero crossover thereof such that a peak in the other of said quadrature output signals is sampled due to the 90 degree phase relationship between said quadrature output signals.

6. The apparatus of claim 5 and further including means for permitting sampling of said other quadrature output signal only when said other quadrature output signal is positive.

7. The apparatus of claim 6 wherein said last-mentioned means includes a zero crossover detector coupled to said other quadrature output signal for generating a positive going pulse starting at a positive going zero crossover transition of said other quadrature output signal and ending on the subsequent negative going crossover thereof; and, wherein said sampling means includes means for sampling said other quadrature output signal upon the occurrence of said positive going pulse and said sampling pulse.

8. The apparatus of claim 4 and further including means coupled to said quadrature output signals for determining the direction of movement of said scale.

9. The apparatus of claim 1 and further including means coupled to said error signal for generating a histogram of said error signal to permit determination of the functioning of said encoder over time.

* * * * *